United States Patent
Chen et al.

(10) Patent No.: US 10,416,380 B1
(45) Date of Patent: Sep. 17, 2019

(54) SUSPENDED PHOTONIC WAVEGUIDES WITH TOP SIDE SEALING

(71) Applicant: Acacia Communications, Inc., Maynard, MA (US)

(72) Inventors: Li Chen, Edison, NJ (US); Long Chen, Marlboro, NJ (US); Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/631,781

(22) Filed: Jun. 23, 2017

Related U.S. Application Data

(60) Provisional application No. 62/353,959, filed on Jun. 23, 2016.

(51) Int. Cl.
*G02B 6/122* (2006.01)
*G02B 6/14* (2006.01)
*G02B 6/132* (2006.01)
*G02B 6/12* (2006.01)

(52) U.S. Cl.
CPC ............ *G02B 6/122* (2013.01); *G02B 6/132* (2013.01); *G02B 6/14* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| | | | |
|---|---|---|---|
| 4,781,424 A | 11/1988 | Kawachi et al. | |
| 5,210,801 A * | 5/1993 | Fournier | G02B 6/124 385/129 |
| 6,847,750 B1 * | 1/2005 | Baumann | G02F 1/011 385/129 |
| 6,947,653 B2 * | 9/2005 | Bhardwaj | G02B 6/1203 385/10 |
| 7,565,038 B2 * | 7/2009 | Earnshaw | G02F 1/0147 385/1 |
| 8,192,638 B2 * | 6/2012 | Pomerene | B82Y 20/00 216/2 |
| 9,002,163 B2 * | 4/2015 | Fang | G02B 6/1228 385/129 |
| 9,059,252 B1 * | 6/2015 | Liu | H01L 21/7682 |
| 9,703,038 B1 | 7/2017 | Chen | |
| 2002/0041739 A1 | 4/2002 | Wu | |

(Continued)

FOREIGN PATENT DOCUMENTS

JP 2009-192842 A 8/2009

OTHER PUBLICATIONS

International Search Report and Written Opinion dated Jun. 12, 2017 for Application No. PCT/US2017/026572.

(Continued)

*Primary Examiner* — Michael Stahl
(74) *Attorney, Agent, or Firm* — Joseph D'Angelo

(57) ABSTRACT

Techniques for forming a photonic device that includes a suspended photonic structure suspended over a silicon substrate are described. A sealed cavity is positioned between the silicon substrate and the photonic structure, and one or more regions of dielectric material act to seal the cavity. Additional structure(s) may be formed on top of the dielectric material.

20 Claims, 7 Drawing Sheets

(56) References Cited

U.S. PATENT DOCUMENTS

| | | | |
|---|---|---|---|
| 2005/0128592 A1* | 6/2005 | Nishii | B82Y 20/00 |
| | | | 359/573 |
| 2005/0169566 A1* | 8/2005 | Takahashi | G02F 1/011 |
| | | | 385/1 |
| 2006/0275004 A1 | 12/2006 | Fujii et al. | |
| 2009/0274418 A1* | 11/2009 | Holzwarth | B82Y 20/00 |
| | | | 385/30 |
| 2009/0297092 A1* | 12/2009 | Takahashi | G02F 1/0147 |
| | | | 385/14 |
| 2012/0076465 A1 | 3/2012 | Chen et al. | |
| 2012/0219249 A1 | 8/2012 | Pitwon | |
| 2015/0340273 A1* | 11/2015 | Jaffe | H01L 21/76224 |
| | | | 257/506 |
| 2016/0147020 A1* | 5/2016 | Musk | G02B 6/30 |
| | | | 385/43 |

OTHER PUBLICATIONS

Chen et al., Low-Loss and Broadband Cantilever Couplers Between Standard Cleaved Fibers and High-Index-Contrast $Si_3N_4$ or Si Waveguides. IEEE Photonics Technology Letters. Dec. 1, 2010; 22(23):1744-6.

* cited by examiner

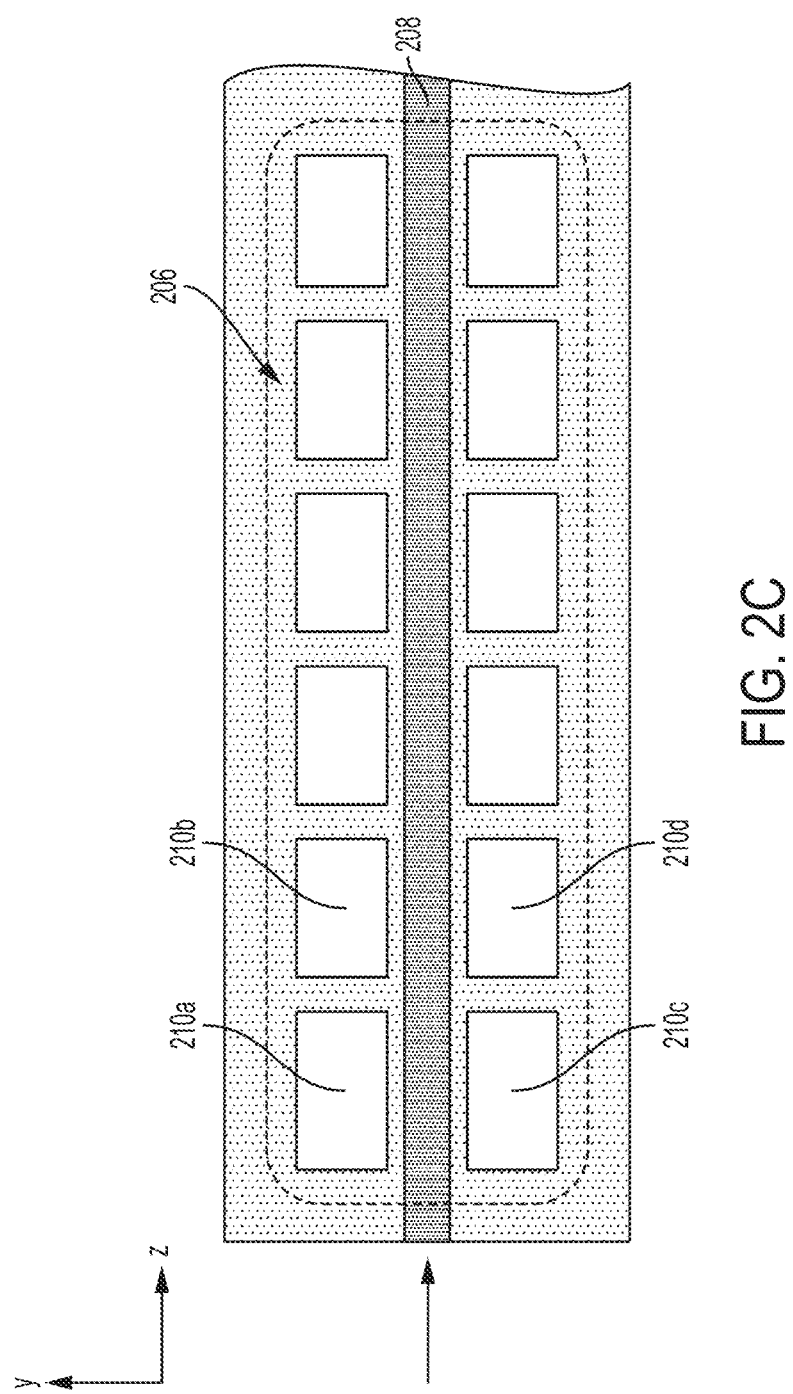

SUSPENDED PHOTONIC WAVEGUIDES WITH TOP SIDE SEALING

RELATED APPLICATIONS

The present application claims the benefit under 35 U.S.C. § 119(e) of U.S. Provisional Patent Application Ser. No. 62/353,959 entitled "SUSPENDED PHOTONIC WAVEGUIDES WITH TOP SIDE SEALING," filed Jun. 23, 2016, which is incorporated herein by reference in its entirety.

BACKGROUND

Field

The present application relates to suspended photonic waveguides and related apparatus and methods.

Related Art

A photonic device may include optical waveguides integrated on a substrate. A suspended optical waveguide can be formed by removing part of the substrate under an optical waveguide to form a cavity.

BRIEF SUMMARY

According to an aspect of the present application, an apparatus is provided. The apparatus comprises a photonic structure suspended over a silicon substrate, a sealed cavity positioned between the silicon substrate and the photonic structure, and at least one region of dielectric material formed to seal the cavity. The at least one region of dielectric material overlaps with the sealed cavity within a layer positioned over the silicon substrate.

According to another aspect of the present application, method for forming a photonic device is provided. The method comprises forming a photonic structure over a silicon substrate, forming at least one trench that extends to the silicon substrate, removing a portion of the silicon substrate underneath the photonic structure, and filling, at least partially, the at least one trench with dielectric material to form a sealed cavity between the photonic structure and the silicon substrate.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2C is a planar view of an example of a suspended optical spot size converter with a sealed cavity, according to a non-limiting embodiment.

DETAILED DESCRIPTION

Figure 1A:
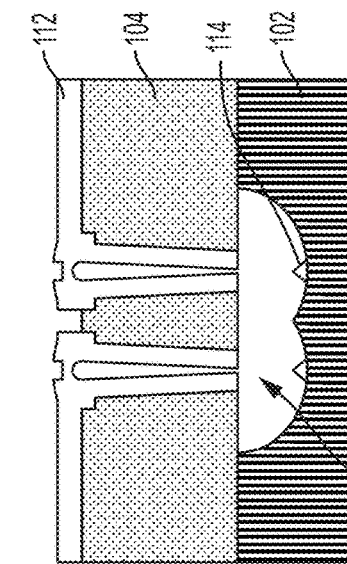
FIGS. 1A-1E illustrate, in cross-sectional views, an exemplary method for sealing a cavity of a suspended photonic structure, according to a non-limiting embodiment.

Aspects of the present application relate to integrated photonic devices having one or more suspended photonic structures, including photonic structures that have optical waveguide(s) (e.g., an optical mode spot size converter or a thermal optical phase shifter). In particular, a cavity underneath a photonic structure, resulting in a suspended photonic structure, may provide desired optical and/or thermal performance of the photonic structure. For example, an optical mode spot size converter that is suspended may exhibit reduced or eliminated optical leakage into an underlying substrate compared to on optical structure that is not suspended. As another example, a thermal optical phase shifter that is suspended may exhibit reduced or eliminated heat conduction to a substrate and increased power efficiency compared to a structure that is not suspended.

Challenges may arise in formation of a photonic device having a suspended photonic structure because the topography of the photonic structure may limit further processing of the photonic device (e.g., flip-chip bonding to circuitry, epoxy bonding to another substrate). Once a cavity is formed, further processing may lead to defects in the cavity, including the cavity being undesirably filled with one or more materials, which may reduce performance of the resulting photonic device. For example, packaging of the device may include using an epoxy to bond the suspended photonics structure to another substrate. During such a packaging process, epoxy may enter the cavity through any unblocked trenches that are open to the outside such that performance, including optical stability and thermal stability, of the photonic structure is degraded. Furthermore, additional processing steps may include exposing the device to high temperatures, causing the epoxy to expand and thus leading to defects such as cracking of the suspended photonic structure.

Aspects of the present application provide suitable techniques for sealing a cavity of a suspended photonic structure, which may allow for further processing of the photonic structure without substantially impacting the performance of the photonic structure. The cavity sealing techniques described herein may limit the degree to which the cavity is filled with another material, thus maintaining the integrity of the cavity, or at least limiting the degradation of the cavity. In at least some embodiments, the cavity may be sealed without meaningfully filling the cavity; that is, the cavity may remain substantially empty. In some instances, some material may enter the cavity during sealing, but not form structures that bridge between interior surfaces of the cavity that may impact performance of the suspended photonic structure.

Such cavity sealing techniques may allow for protection of the cavity under the suspended photonic structure, particularly during additional processing steps once the cavity is formed. Protecting the cavity may allow for many of the benefits of having the cavity, including the performance of the suspended photonic structure, to be maintained. In addition, the sealed cavity may prevent or reduce moisture from entering the cavity, which would otherwise impact performance of the resulting photonic device. Sealing the topside of the cavity may also allow for implementing photolithography techniques once the cavity is formed. Without sealing the cavity, air bubbles may form within photoresist that is applied over the photonic structure, which may form defects in the subsequently formed structure. By sealing the cavity to be airtight, air within the cavity is trapped and unable to form bubbles within photoresist, or other material that may be susceptible to air bubble formation, applied over the photonic structure.

Formation of the suspended photonic structure may include forming one or more trenches in a layer that includes the photonic structure. A trench may extend to the underlying substrate and may be referred to as an "access trench," which allows for removal of a portion of the substrate to form a cavity underneath the photonic structure. Techniques of the present application may include sealing the cavity by filling, at least partially, the one or more trenches with dielectric material. The techniques used to fill the one or more trenches may allow for sealing of the cavity without the dielectric material significantly filling the cavity such that the cavity may remain substantially empty of dielectric material. The dielectric material may be deposited from a top surface of the photonic structure (e.g., a surface proximate to the photonic structure opposite the cavity) such that dielectric material enters one or more trenches to seal the cavity, a technique which may be referred to as "top side sealing" of the underlying cavity. As the thickness of the dielectric material grows on the sidewalls of the trench, the dielectric material from opposing sides of the trench may meet to form a seal for the cavity. In this manner, the dielectric material may act to plug a trench that extends to the cavity. The cavity sealing process may allow for sealing of a trench without substantially filling the underlying cavity. A trench may be suitably sized and shaped to allow for the dielectric filling process to seal the cavity underneath the photonic structure. A trench may have a dimension (e.g., less than 20 µm) that allows for sealing of the trench by depositing the dielectric material from a surface proximate to the photonic structure opposite the cavity. In some embodiments, depositing the dielectric material may include using a deposition process (e.g., plasma-enhanced chemical vapor deposition (PECVD)) where dielectric material is deposited at a faster rate at the edges and/or corners closest to where the deposition occurs such that the thickness of the dielectric material at these locations grows to form a plug for the trench and seal the cavity. Additional dielectric material may be formed over the suspended photonic structure to allow for further processing and/or fabrication of the photonic device. In some embodiments, the dielectric material may be planarized prior to additional processing and/or fabrication of the photonic device.

The aspects and embodiments described above, as well as additional aspects and embodiments, are described further below. These aspects and/or embodiments may be used individually, all together, or in any combination of two or more, as the application is not limited in this respect.

An exemplary process for sealing a cavity of a suspended photonic structure is shown in FIGS. 1A-1E, which show cross-sectional views of a portion or all of a photonic device. Photonic structure 108 is formed over silicon substrate 102. As shown in FIG. 1A, photonic structure 108 is formed in layer 104. It should be appreciated that a photonic structure may be formed in any suitable number of layers as aspects of the present application are not limited to the types of photonic structures and/or the number of layers included in layer 104. The thickness of layer 104 may have any suitable value, as aspects of sealing a cavity underneath a photonic structure, where the cavity is formed by forming one or more trenches through layer 104, are not limited to the thickness of one or more layers that form layer 104. Photonic structure 108 is suspended over silicon substrate 102 by forming one or more trenches 110 through layer 104 and partially removing the silicon substrate 102 underneath photonic structure 108 to form cavity 106. The suspended photonic structure 108 may include one or more materials, including silicon, silicon oxide (e.g., $SiO_2$), silicon oxynitride, and silicon nitride. In some embodiments photonic structure 108 may include an optical waveguide. The optical waveguide may include a waveguide core material (e.g., silicon, silicon nitride) surrounded by a cladding material (e.g., $SiO_2$).

A trench may extend to silicon substrate 102 and may allow for removal of a portion of silicon substrate 102 to form cavity 106 underneath photonic structure 108. Trench(es) 110 may be formed at a distance from photonic structure 108 that allows for removal of silicon substrate 102 from underneath the photonic structure, such as by using an etching process that forms an undercut region in silicon substrate 102 underneath photonic structure 108. The distance between a trench and a photonic structure may have a value in the range between 1 µm to 10 µm, or any value or range of values in that range. In some embodiments, a trench may be formed at a distance of approximately 2 µm from a photonic structure. Trench(es) 110 may be patterned in a region of layer 104 separate from photonic structure 108 to reduce or remove the impact of the trench(es) 110 on the desired performance of photonic structure 108. A trench 110 may be positioned at a suitable distance from photonic structure 108 such that the trench does not impact an optical mode of photonic structure 108. In some embodiments, a trench may be formed at a distance from a photonic structure that is equal to or greater than a size of an optical mode of the photonic structure. A trench may be formed such that a sidewall of the trench is positioned at a distance from a photonic structure that is equal to or greater than a size of an optical mode of the photonic structure. Trench(es) 110 may be suitably arranged and positioned relative to photonic structure 108 such that a single cavity is formed upon removal of part of silicon substrate 102. A trench may have a width, D, that allows for suitable filling of the trench with dielectric material to form a seal for the cavity. The width, D, may have a value in the range between 100 nm to 40 µm, or any value or range of values in that range. In some embodiments, a trench may have a width of less than 20 µm. In some embodiments, a trench may have a width of less than 30 µm. In some embodiments, a trench may have a width in the range of 1 µm to 20 µm, or any value or range of values in that range.

In some embodiments, a trench may have varying width along the length of the trench forming one or more tapered sidewalls of the trench. A trench may have one or more tapered sidewalls such that the trench has a smaller width proximate to silicon substrate 102 and/or cavity 106 than distal from silicon substrate 102 and/or cavity 106, for example in a layer of the device that includes photonic structure 108. Alternatively, a trench may have one or more tapered sidewalls where the trench has a larger width proximate to silicon substrate 102 and/or cavity 106 than distal from silicon substrate 102 and/or cavity 106. The slope of the tapered sidewalls of a trench may be controlled based on an etching process used to form the trench. As shown in FIG. 1A, the sidewalls of trench 110 may be tapered such that there is an angle θ between a sidewall of the trench and a surface of layer 104 proximate to cavity 106 and/or silicon substrate 102. In some embodiments, angle θ may be less than or equal to 90°. The slope of the tapered sidewalls of a trench may have angle θ in the range of 70° to 90°, or any angle or range of angles in that range. In some embodiments, angle θ may be greater than 90°.

Forming trench(es) 110 through layer 104 may include using any suitable etching process. In some embodiments, trench(es) 110 may be formed by patterning locations for the trench(es) 110 using a suitable mask and etching at least through layer 104 using an anisotropic etching process (e.g., anisotropic wet etching). Prior to formation of cavity 106, a trench may extend to silicon substrate 102. In some embodiments, a trench may be formed through only layer 104. In other embodiments, part of silicon substrate 102 may be removed in forming a trench such that the resulting trench extends though layer 104 and into part of silicon substrate 102.

Cavity 106 may be formed by removing part of silicon substrate 102 through trench(es) 110 using any suitable etching process. In some embodiments, cavity 106 is formed by using an isotropic etching process (e.g., wet etching, chemical etching). to remove a portion of silicon substrate 102 underneath photonic structure 108. An isotropic etching process may allow for cavity 106 to form by extending laterally within silicon substrate 102 and underneath photonic structure 110. In some embodiments, multiple trenches may be formed, and a cavity underneath a photonic structure may be formed using an isotropic etching process by removing portions of the silicon substrate from the trenches to form individual cavities associated with the trenches that extend laterally during the etching process and may connect to form a single cavity. The cross-sectional view shown in FIG. 1A shows a trench 110 on either side of photonic structure 108. Formation of cavity 106 using an isotropic etching process may include removing portions of silicon substrate 102 from the trenches to form individual cavities associated with the two trenches that extend laterally and underneath photonic structure 108 during the etching process and connect to form cavity 106. As shown in FIG. 1A, the shape of the resulting cavity 106 may include concave regions that individually correspond to one of the trenches. A concave region may be centered to align with a trench. The depth of the cavity may be largest, or have a maximum value, within a region that overlaps with a trench.

Figure 1B:
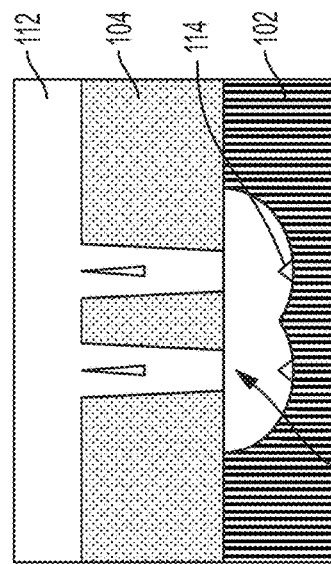
Figure 1C:
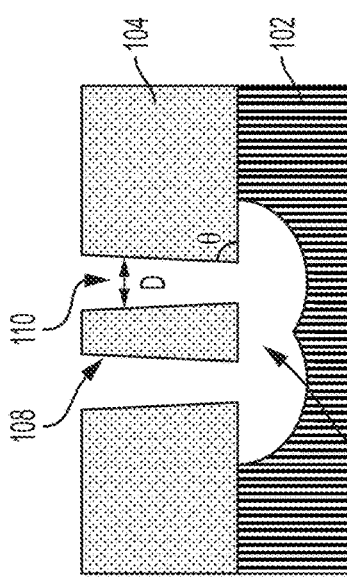

After formation of cavity 106, dielectric material 112 may be formed over photonic structure 108, as shown in FIGS. 1B and 1C. The dielectric material 112 may include one or more suitable dielectric materials, including silicon oxide (e.g., SiO$_2$) and silicon oxynitride. Dielectric material 112 may be formed by deposition of the dielectric material using a suitable deposition technique. In some embodiments, dielectric material 112 may be formed by plasma-enhanced chemical vapor deposition (PECVD).

Dielectric material 112 may enter trench(es) 110 and fill, at least partially, the trench(es) 110 to seal cavity 106. In some embodiments, the sealed cavity may be substantially free of dielectric material. One or more regions of dielectric material may act as a plug for a trench. The one or more regions of dielectric material may be formed over cavity 106 such that the one or more regions of dielectric material are positioned to overlap with cavity 106. The region of dielectric material may fill the trench along the entire width D of the trench at a location along the length of the trench to form a complete barrier to cavity 106. In some embodiments, a region of dielectric material within a trench may fill the trench along the entire width D at multiple locations along the length of the trench. In some embodiments, a region of dielectric material within a trench may fill the trench along the entire width D at a surface of layer 104 proximate to cavity 106.

Some dielectric material may inadvertently enter cavity 106, but according to the processes described herein may not substantially fill cavity 106. As shown in FIG. 1B, dielectric material 114 may form on a surface of cavity 106. In some embodiments, dielectric material 114 may form a layer coating a bottom surface of cavity 106 where the bottom surface is opposite to an opening of a trench. The amount of dielectric material that enters cavity 106 may be limited such that the dielectric material does not form bridges of dielectric material that extend through the cavity since such bridges may negatively impact performance of photonic structure 108 by reducing or removing the benefits provided by having cavity 106 to suspend photonic structure 108 from silicon substrate 102.

Dielectric material 112 may be formed on one or more exposed surfaces, including sidewalls of a trench, a surface of layer 104, over photonic structure 108, and a surface of cavity 106. Depending on the techniques used to form dielectric material 112, the rate at which dielectric material forms on different surface features may vary. In some embodiments, dielectric material may be deposited at a faster rate on edges and/or corners than on more planar surfaces. As shown in FIGS. 1B and 1C, dielectric material 112 may grow faster at or near the corners of trench(es) 110 such that the thickness of dielectric material at these locations grows to eventually connect and seal cavity 106. In some embodiments, a region of dielectric material within a trench may not completely fill the trench such that a gas void, filled with air or another type of gas, forms within the region of dielectric material. In such instances the gas void within the region of dielectric material is separate from the underlying cavity. FIG. 1C shows exemplary gas void 120 which may be present within a trench as a result of sealing cavity 106 by depositing dielectric material within the trench.

Dielectric material 112 may be formed over photonic structure 108, as shown in FIGS. 1B and 1C. In some embodiments, dielectric material 112 may have a thickness that allows for subsequent fabrication of one or more components over photonic structure 108 suspended over cavity 106, which is sealed by dielectric material 112 and protected from other materials entering cavity 106 that may otherwise degrade the optical and/or thermal performance of the resulting device. One or more components may be formed over photonic structure 108. Other components that may be formed over photonic structure 108 may include additional photonic structure(s), circuitry, contact pad(s), conducting pillar(s) (e.g., copper pillars), metal layer, fiber attachment support, epoxy, polymer(s), bonding adhesives, and dielectric material(s).

Figure 1D:
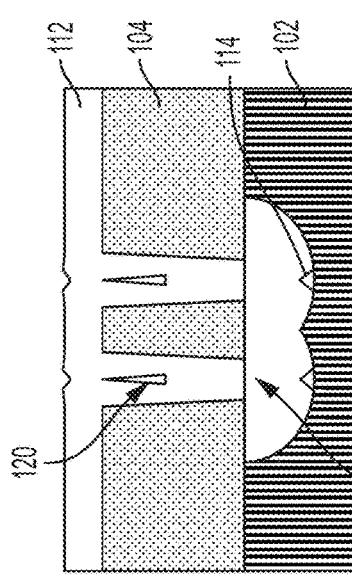

In some embodiments, dielectric layer 112 may be planarized using a chemical-mechanical polishing (CMP) process or any other suitable planarization technique. Planarization may form a surface of dielectric material 112 on which one or more additional components (e.g., photonic structure, contact pad, conducting pillar, metal layer) may be formed. FIG. 1D shows an exemplary cross-sectional view of dielectric material 112 having a planarized surface. In some instances, planarization of dielectric material 112 may occur prior to further processing, microfabrication, and/or packaging of the photonic device.

Figure 1E:
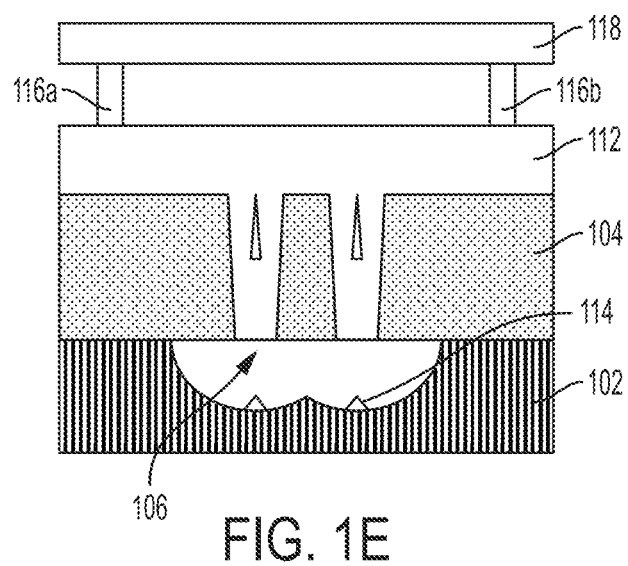

Photonic structure 108 and/or silicon substrate 102 may be coupled to another substrate. In some embodiments, photonic structure 108 and/or silicon substrate 102 may be coupled to another substrate using epoxy to bond a surface, such as a planarized surface of dielectric material, to another substrate. In some embodiments, photonic structure 108 and/or silicon substrate 102 may be bonded to another substrate that includes one or more circuit structures. In such embodiments, a suitable flip-chip bonding technique may be used to form one or more contact pads on a surface over photonic structure 108, such as a planarized surface of dielectric material 112, and bonded to one or more contact pads on a chip (e.g., semiconductor chip) that may include circuitry. In some embodiments, a contact pad may be formed of gold-tin solder. In some embodiments, one or more conducting pillars (e.g., copper pillars) may be formed on a surface (e.g., planarized surface of dielectric material 112) and bonded to another substrate that includes one or more circuit structures. FIG. 1E shows an exemplary cross-sectional view of photonic structure 108 bonded to substrate 118 through conducting pillars 116a and 116b.

Figure 2A:
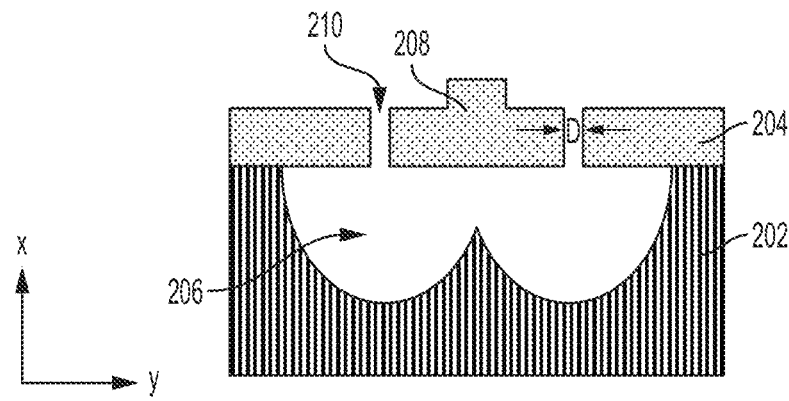
FIG. 2A is a cross-sectional view of a suspended optical spot size converter, according to a non-limiting embodiment.
Figure 2B:
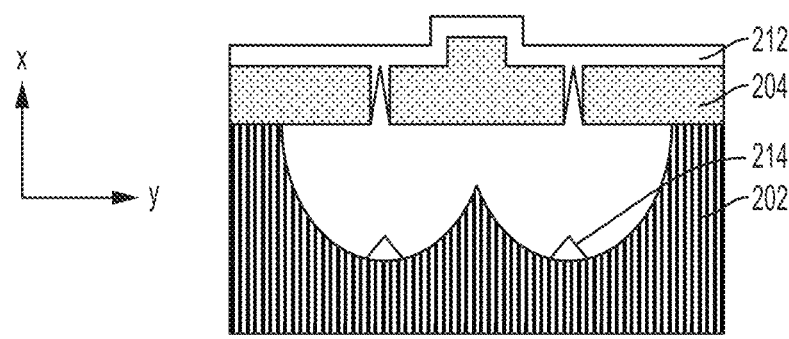
FIG. 2B is a cross-sectional view of a suspended optical spot size converter with a sealed cavity, according to a non-limiting embodiment.

Techniques for sealing a cavity described herein may be used to form any suitable type of suspended photonic structure, including an optical spot size converter and a thermal-optical phase shifter. FIG. 2A shows a cross-sectional view of an exemplary optical spot size converter that includes optical waveguide 208 within structure layer 204 formed over silicon substrate 202 where cavity 206 is positioned between waveguide 208 and silicon substrate 202. Trench(es) 210 are formed within structure layer 204 and extend through layer 204 to silicon substrate 202 and may be used to form cavity 206. Trench(es) 210 may be patterned at a distance from waveguide 208 to be sufficiently away from the optical mode of waveguide 208, which may reduce or remove the impact of the trench(es) 210 on propagation of the optical mode along waveguide 208. In some embodiments, a trench may be positioned from waveguide 208 along the y-direction such that a distance between the trench and waveguide 208 is equal to or greater than a size of an optical mode of the waveguide (e.g., size of the optical mode along the y-direction). FIG. 2B shows a cross-sectional view where cavity 206 is sealed by filling, at least partially, dielectric material 212 in trench(es) 210 and forming dielectric material 212 over waveguide 208. Some dielectric material 214 may enter cavity 206 and form on a surface of cavity 206.

Any suitable number of trench(es) may be used to form a cavity underneath a photonic structure. In some embodiments, multiple trenches may be formed along a dimension of the photonic structure and portions of silicon substrate may be removed from the individual trenches to form a single cavity. FIG. 2C shows an exemplary planar view of the optical spot size converter shown in FIG. 2B. Regions of dielectric material 210a, 210b, 210c, 210d are positioned proximate to waveguide 208 and along the length of waveguide 208, which may correspond to the direction of light propagation along waveguide 208 (e.g., along the z-direction shown in FIG. 2C). As shown in FIG. 2C, light may be coupled into waveguide 208 (as indicated by the arrow on the left). However, it should be appreciated that, in some embodiments, waveguide 208 may couple to one or more optical components of a photonic device and what is shown in FIG. 2C is a region of the overall photonic device (e.g., one edge may represent a facet of photonic integrated circuit (PIC)). In some embodiments, the planar view shown in FIG. 2C may be part of a PIC where light couples with waveguide 208, at one or both ends of waveguide 208, from another photonic structure (e.g., another waveguide, a waveguide splitter, waveguide combiner, facet optical coupler). Regions of dielectric material 210a, 210b, 210c, 210d may correspond to trenches used to form cavity 206 (outlined by the dashed line) underneath at least a portion of waveguide 208 where the trenches were subsequently filled with dielectric material after formation of cavity 206. The arrangement of trenches in a lattice configuration, such as would result in the arrangement of regions of dielectric material shown in FIG. 2C, may allow for a single cavity to be formed underneath waveguide 208. As portions of the underlying silicon substrate are removed, individual cavities corresponding to the trenches may form, and the individual cavities may extend laterally to connect to form cavity 206. Although twelve (12) regions of dielectric material are shown in FIG. 2C, it should be appreciated that any suitable number of regions of dielectric material may be formed as part of forming and sealing a cavity underneath a waveguide or other photonic structure. Regions of dielectric material 210a, 210b, 210c, 210d may have any suitable size and shape. As shown in FIG. 2C, regions of dielectric material may have a rectangular shape in a planar view, although a region of dielectric material may have other shapes including square, circular, and elliptical.

Figure 3A:
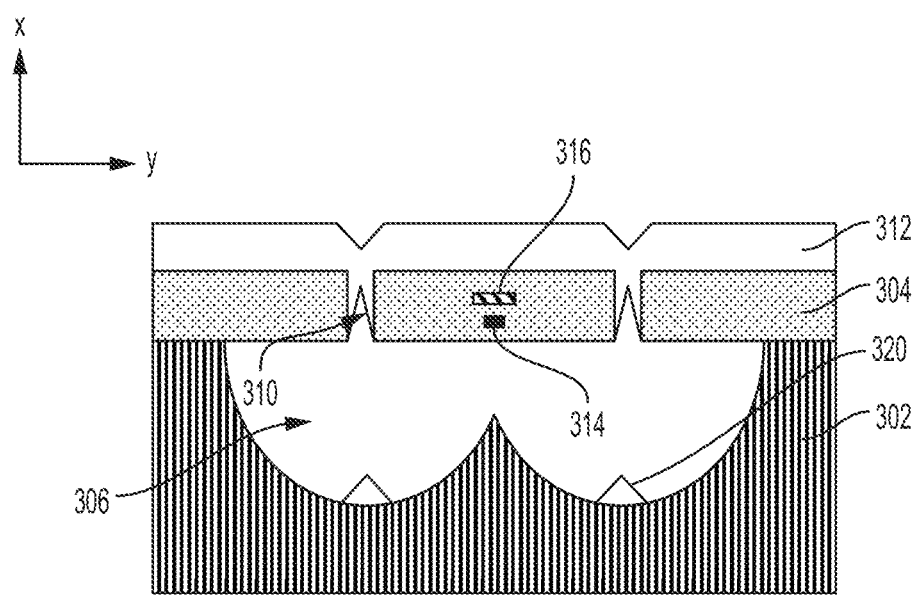
FIG. 3A is a cross-sectional view of a suspended photonic phase shifter with a sealed cavity, according to a non-limiting embodiment.

FIG. 3A shows a cross-sectional view of an exemplary photonic phase shifter suspended over a sealed cavity 306. The photonic phase shifter includes a waveguide 314 (e.g., silicon waveguide) and metal layer 316 formed in layer 304 and suspended over cavity 306, which is formed in the silicon substrate 302. As shown in FIG. 3A, waveguide 314 is formed between metal layer 316 and cavity 306. Metal layer 316 may be positioned proximate to a side of waveguide 314 opposite cavity 306. Metal layer 316 may be configured to provide heat to some or all of waveguide 314, such as by electrically coupling metal layer 316 to a current or voltage source and providing a sufficient level of current or voltage to metal layer 316 such that metal layer 316 generates heat in a volume surrounding metal layer 316, which may include waveguide 314. Dielectric material 312 is formed over the suspended photonic phase shifter and fills, at least partially, trenches 310 formed through layer 304 to seal cavity 306. Some dielectric material 320 may enter cavity 306 during sealing, and the dielectric material 320 may form on a surface of cavity 306. The underlying cavity may allow for improved heat dissipation than if the cavity was otherwise not present. In some instances, the suspended photonic phase shifter may have an efficiency that is approximately 10 times more efficient with an underlying cavity than if no cavity was present.

Figure 3B:
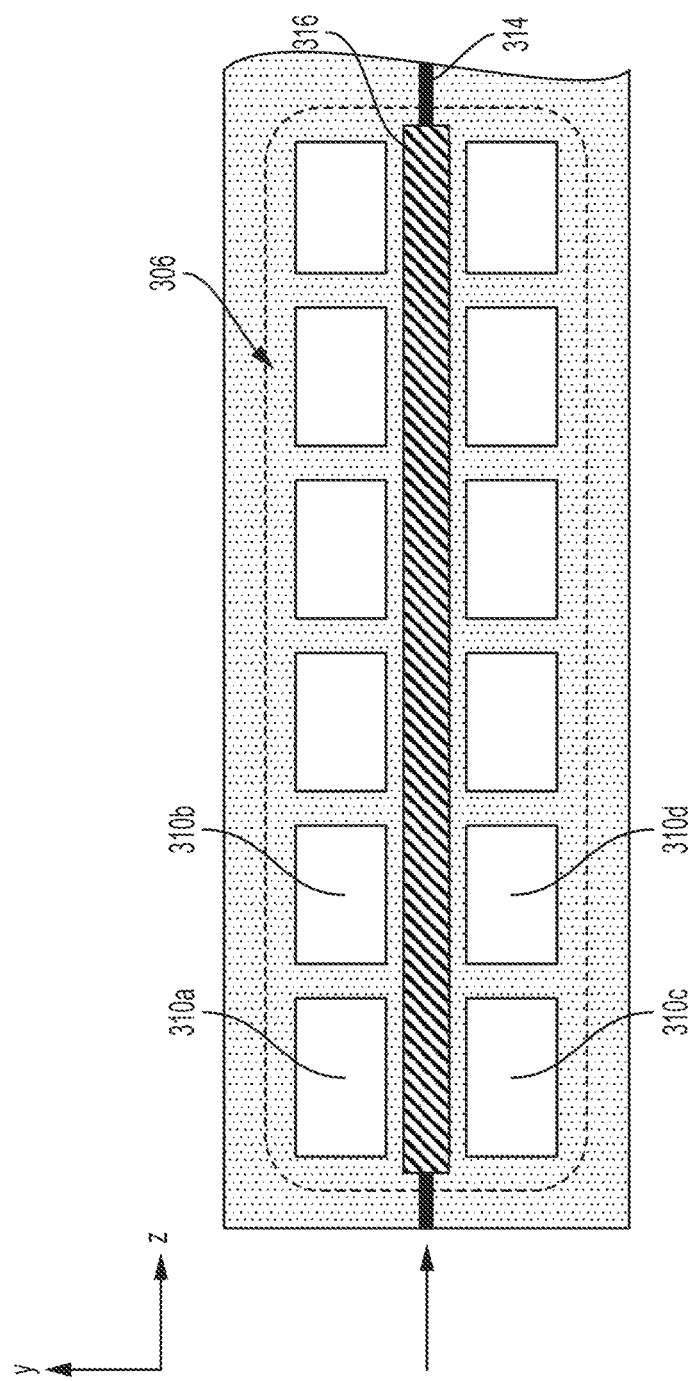
FIG. 3B is a planar view of a suspended photonic phase shifter with a sealed cavity, according to a non-limiting embodiment.

FIG. 3B shows a planar view of the photonic phase shifter shown in FIG. 3A. Regions of dielectric material 310a, 310b, 310c, 310d may correspond to trenches used to form cavity 306 (outlined by the dashed line) underneath at least a portion of waveguide 314 and metal layer 316, where the trenches were subsequently filled with dielectric material after formation of cavity 306. The arrangement of trenches in a lattice configuration, such as would result in the arrangement of regions of dielectric material shown in FIG. 3B, may allow for a single cavity to be formed. As portions of the underlying silicon substrate are removed, individual cavities corresponding to the trenches may form, and the individual cavities may extend laterally to connect to form cavity 306. Although twelve (12) regions of dielectric material are shown in FIG. 3B, it should be appreciated that any suitable number of regions of dielectric material may be formed as part of forming and sealing a cavity underneath a waveguide or other photonic structure. Regions of dielectric material 310a, 310b, 310c, 310d may have any suitable size and shape. As shown in FIG. 3B, regions of dielectric material may have a rectangular shape in a planar view, although a region of dielectric material may have other shapes including square, circular, and elliptical. As shown in FIG. 3B, light may be coupled into waveguide 314 (as indicated by the arrow on the left). However, it should be appreciated that, in some embodiments, waveguide 314 may couple to one or more optical components of a photonic device and what is shown in FIG. 3B is a region of the overall photonic device (e.g., one edge may represent a facet of photonic integrated circuit (PIC)). In some embodiments, the planar view shown in FIG. 3B may be part of a PIC where light couples with waveguide 314, at one or both ends of waveguide 314, from another photonic structure (e.g., another waveguide, a waveguide splitter, waveguide combiner, facet optical coupler).

Figure 4:
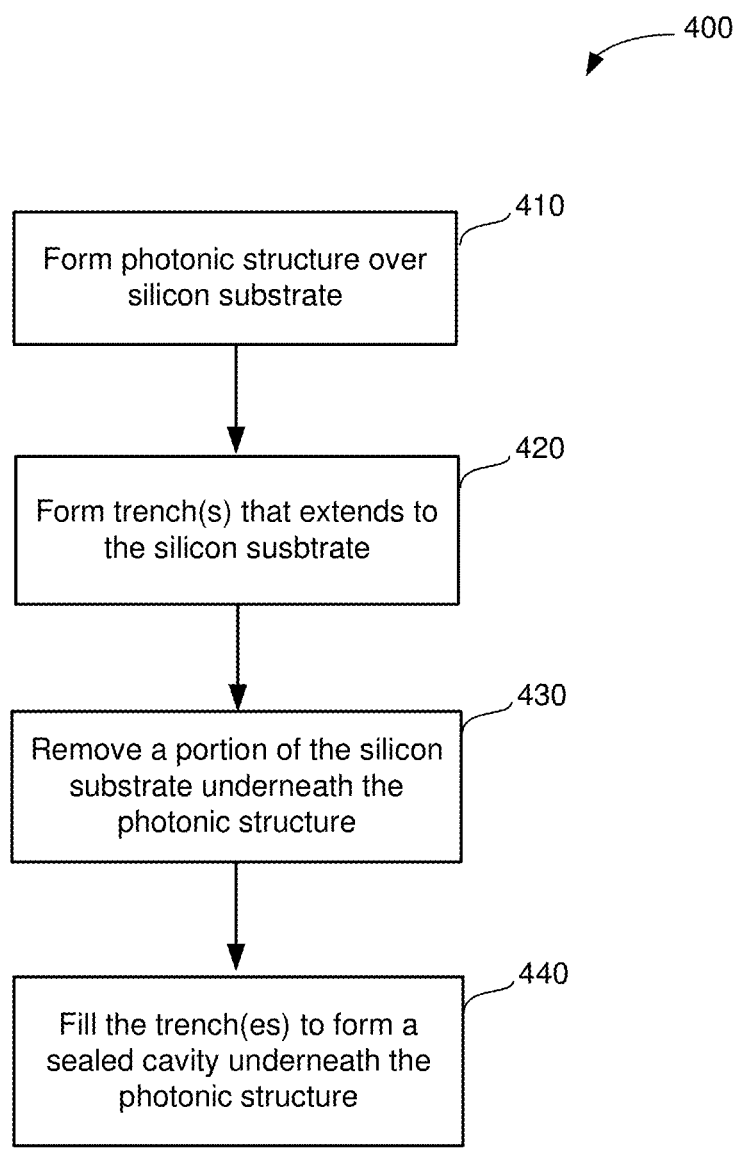
FIG. 4 is a schematic illustrating an exemplary method for forming a suspended photonic structure, according to a non-limiting embodiment.

Some embodiments of the present application relate to a method of forming a photonic device having a photonic structure suspended over a silicon substrate where a sealed cavity is positioned between the photonic structure and the silicon substrate. Any fabrication techniques suitable for silicon-based photonic devices may be used according to some embodiments. FIG. 4 shows steps of an exemplary method of manufacturing a suspended photonic structure, although other suitable methods and/or additional steps may be used to form the suspended photonic structures described above. Method 400 may start with a silicon substrate. At act 410, a photonic structure may be formed over silicon substrate. In some embodiments the photonic structure may be formed as part of a layer in contact with the silicon substrate. In some embodiments, the photonic structure may be formed in one or more layers formed over the silicon substrate. In some embodiments, the photonic structure may include a waveguide. In some embodiments, the photonic structure is an optical mode spot size converter. In some embodiments, the photonic structure is a photonic phase shifter. In such embodiments, the photonic structure may include a waveguide and a metal layer configured to provide heat to the waveguide. The metal layer may be formed proximate to a side of the waveguide opposite the silicon substrate.

Method 400 may proceed by forming one or more trenches that extend to the silicon substrate by act 420. The one or more trenches may extend from a surface, such as a surface of a layer over the photonic structure to the silicon substrate. Suitable techniques for forming a trench may include anisotropically etching through one or more layers that include the photonic structure. In embodiments where the photonic structure includes a waveguide, forming the one or more trenches may include forming multiple trenches proximate to the waveguide and along the length of the waveguide.

Method 400 may include removing a portion of the silicon substrate from underneath the photonic structure by act 430. Suitable techniques for removing the silicon substrate may include isotropically etching the silicon substrate. Method 400 may proceed by filling, at least partially, the one or more trenches to form a sealed cavity underneath the photonic structure by act 440. The one or more trenches may be filled using one or more dielectric materials, including silicon oxide (e.g., $SiO_2$) and silicon oxynitride. In some embodiments, filling of the one or more trenches with dielectric material may include depositing dielectric material at corners and/or edges of the one or more trenches at a faster rate than the dielectric material fills the cavity. Filling of the one or more trenches with dielectric material may include depositing dielectric material by a plasma-enhanced chemical vapor deposition (PECVD) process.

Methods consistent with method 400 may also include, subsequent to act 440, forming a layer of dielectric material over the photonic structure and planarizing a surface of the dielectric material. Planarizing of the dielectric material may be performed using a using a chemical-mechanical planarization (CMP) process.

Methods consistent with method 400 may also include, subsequent to act 440, bonding the photonic structure to another substrate, such as a substrate with circuitry. In some embodiments, the photonic structure may be flip-chip bonded to the other substrate. Some embodiments may include forming one or more conducting pillars and bonding the one or more conducting pillars to one or more circuit structures of a substrate separate from the silicon substrate.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An apparatus comprising:
 a photonic structure suspended over a silicon substrate;
 a sealed cavity positioned between the silicon substrate and the photonic structure, wherein the sealed cavity is bounded at least in part by the silicon substrate; and
 at least one region of dielectric material formed to seal the cavity, wherein the at least one region of dielectric material overlaps with the sealed cavity within a layer that includes the photonic structure.

2. The apparatus of claim 1, wherein the at least one region of dielectric material is configured as at least one plug for at least one trench that extends from the layer that includes the photonic structure to the cavity.

3. The apparatus of claim 1, wherein the at least one region of dielectric material encloses at least one gas void separate from the cavity.

4. The apparatus of claim 1, wherein the photonic structure includes a waveguide and the cavity extends along at least a portion of the waveguide.

5. The apparatus of claim 4, wherein the at least one region of dielectric material includes a plurality of regions of dielectric material positioned proximate to the waveguide along the length of the waveguide.

6. The apparatus of claim 4, further comprising a metal layer formed proximate to a side of the waveguide opposite the cavity, wherein the metal layer is configured to provide heat to at least part of the waveguide.

7. The apparatus of claim 1, further comprising a layer of dielectric material formed proximate to a side of the photonic structure opposite the cavity.

8. The apparatus of claim 1, wherein the at least one region of dielectric material fills the entire width of at least one trench for at least one location along the at least one trench, wherein the at least one trench extends from the layer that includes the photonic structure to the cavity.

9. The apparatus of claim 8, wherein the width of the at least one trench at the at least one location is less than 5 µm.

10. The apparatus of claim 1, further comprising at least one circuit structure positioned on a side of the photonic structure opposite the cavity.

11. The apparatus of claim 10, further comprising at least one conducting pillar configured to electrically couple to the at least one circuit structure and positioned between the layer that includes the photonic structure and a layer that includes the at least one circuit structure.

12. The apparatus of claim 1, wherein the photonic structure is an optical mode spot size converter.

13. The apparatus of claim 1, wherein the photonic structure is a photonic phase shifter.

14. A method for forming a photonic device comprising:
 forming a photonic structure over a silicon substrate;
 forming at least one trench that extends to the silicon substrate;
 removing a portion of the silicon substrate underneath the photonic structure; and
 filling, at least partially, the at least one trench with dielectric material to form a sealed cavity between the photonic structure and the silicon substrate, wherein the sealed cavity is bounded at least in part by the silicon substrate.

15. The method of claim 14, wherein filling the at least one trench with the dielectric material includes depositing the dielectric material at an edge of the at least one trench at a faster rate than the dielectric material fills the cavity.

16. The method of claim 14, wherein filling the at least one trench with the dielectric material includes depositing the dielectric material by plasma-enhanced chemical vapor deposition.

17. The method of claim 14, further comprising:
 forming a layer of dielectric material over the photonic structure; and
 planarizing a surface of the dielectric material.

18. The method of claim 14, wherein forming the photonic structure includes forming a waveguide, and forming at least one trench includes forming a plurality of trenches proximate to the waveguide and along the length of the waveguide.

19. The method of claim 14, wherein forming the photonic structure includes forming a waveguide and a metal layer proximate to a side of the waveguide opposite the silicon substrate, wherein the metal layer is configured to provide heat to at least part of the waveguide.

20. The method of claim 14, further comprising:
 forming at least one conducting pillar; and
 bonding the at least one conducting pillar to at least one circuit structure of a substrate separate from the silicon substrate.

* * * * *